United States Patent
Johnston et al.

(10) Patent No.: US 10,755,575 B2
(45) Date of Patent: Aug. 25, 2020

(54) RAW SENSOR DATA SHARING FOR ENHANCED FLEET-WIDE ENVIRONMENTAL AWARENESS AND SAFETY

(71) Applicant: Cisco Technology, Inc., San Jose, CA (US)

(72) Inventors: Jay Kemper Johnston, Raleigh, NC (US); David C. White, Jr., St. Petersburg, FL (US); Magnus Mortensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 16/118,118

(22) Filed: Aug. 30, 2018

(65) Prior Publication Data
US 2020/0074862 A1 Mar. 5, 2020

(51) Int. Cl.
```
G08G 1/16      (2006.01)
G06K 9/00      (2006.01)
G06K 9/62      (2006.01)
G05D 1/02      (2020.01)
G08G 1/04      (2006.01)
```
(Continued)

(52) U.S. Cl.
CPC .......... *G08G 1/166* (2013.01); *G05D 1/0088* (2013.01); *G05D 1/0214* (2013.01); *G05D 1/0221* (2013.01); *G05D 1/0246* (2013.01); *G05D 1/0276* (2013.01); *G05D 1/0295* (2013.01); *G06K 9/00805* (2013.01); *G06K 9/6256* (2013.01); *G06N 20/00* (2019.01); *G06T 7/75* (2017.01); *G08G 1/04* (2013.01); *G08G 1/163* (2013.01); *G08G 1/22* (2013.01); *G06T 2207/30261* (2013.01); *H04L 67/12* (2013.01); *H04W 4/44* (2018.02)

(58) Field of Classification Search
CPC .......... G08G 1/166; G08G 1/163; G08G 1/22; G08G 1/04; G06N 20/00; G05D 1/0214; G05D 1/0295; G05D 1/0276; G05D 1/0246; G05D 1/0221; G05D 1/0088; G06K 9/6256; G06K 9/00805; H04L 67/12; H04W 4/44; G06T 2207/30261; G06T 7/75
See application file for complete search history.

(56) References Cited

U.S. PATENT DOCUMENTS

| 8,321,125 B2 | 11/2012 | Tengler et al. |
| 8,947,531 B2 | 2/2015 | Fischer et al. |

(Continued)

*Primary Examiner* — Rodney A Butler
(74) *Attorney, Agent, or Firm* — Behmke Innovation Group LLC; James M. Behmke; Jonathon P. Western (57) ABSTRACT

In one embodiment, a first vehicle makes, using a first machine learning-based model, a determination that raw image data captured by the first vehicle does not indicate the presence of a driving hazard. The first vehicle sends a hazard assessment request to a second vehicle in communication proximity of the first vehicle that includes the raw image data. The first vehicle receives a hazard detection response from the second vehicle that indicates a driving hazard identified by the second vehicle by applying a second machine learning-based model to the raw image data included in the hazard assessment request. The first vehicle adjusts a path of travel of the first vehicle to avoid the driving hazard identified by the second vehicle.

17 Claims, 11 Drawing Sheets

(51) Int. Cl.
*G06N 20/00* (2019.01)
*G05D 1/00* (2006.01)
*G08G 1/00* (2006.01)
*G06T 7/73* (2017.01)
*H04L 29/08* (2006.01)
*H04W 4/44* (2018.01)

(56) References Cited

U.S. PATENT DOCUMENTS

| | | | |
|---|---|---|---|
| 9,606,539 | B1 | 3/2017 | Kentley et al. |
| 9,711,050 | B2 | 7/2017 | Ansari |
| 2017/0178498 | A1 | 6/2017 | Mcerlean |
| 2018/0152628 | A1* | 5/2018 | Patel ........................ B60R 1/00 |
| 2018/0375939 | A1* | 12/2018 | Magalhaes de Matos ................ H04L 67/12 |
| 2019/0340924 | A1* | 11/2019 | Abari ................ G06K 9/00805 |

* cited by examiner

RAW SENSOR DATA SHARING FOR ENHANCED FLEET-WIDE ENVIRONMENTAL AWARENESS AND SAFETY

TECHNICAL FIELD

The present disclosure relates generally to computer networks, and, more particularly, to raw sensor data sharing for enhanced fleet-wide environmental awareness and safety.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, to route the vehicles to their destinations and avoid roadway hazards. Trials of autonomous vehicles are now being conducted in many cities.

With the increasing computerization of vehicles also comes an increasing push to connect vehicles to other systems. For example, vehicle to vehicle (V2V) communications allows nearby vehicles to share data between one another, such as detected hazards, coordinating platoons of autonomous vehicles that travel together in unison, and the like. Similarly, vehicle to infrastructure (V2I) communications allow vehicles to communicate with existing computer networks, such as the Internet. By connecting vehicles to the existing infrastructure, it becomes possible to manage and monitor large numbers of vehicles at once. For example, a central traffic service could potentially route vehicles in a city, so as to minimize traffic in the city (e.g., by load balancing the vehicle traffic along the different roads).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first vehicle makes, using a first machine learning-based model, a determination that raw image data captured by the first vehicle does not indicate the presence of a driving hazard. The first vehicle sends a hazard assessment request to a second vehicle in communication proximity of the first vehicle that includes the raw image data. The first vehicle receives a hazard detection response from the second vehicle that indicates a driving hazard identified by the second vehicle by applying a second machine learning-based model to the raw image data included in the hazard assessment request. The first vehicle adjusts a path of travel of the first vehicle to avoid the driving hazard identified by the second vehicle.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1A:
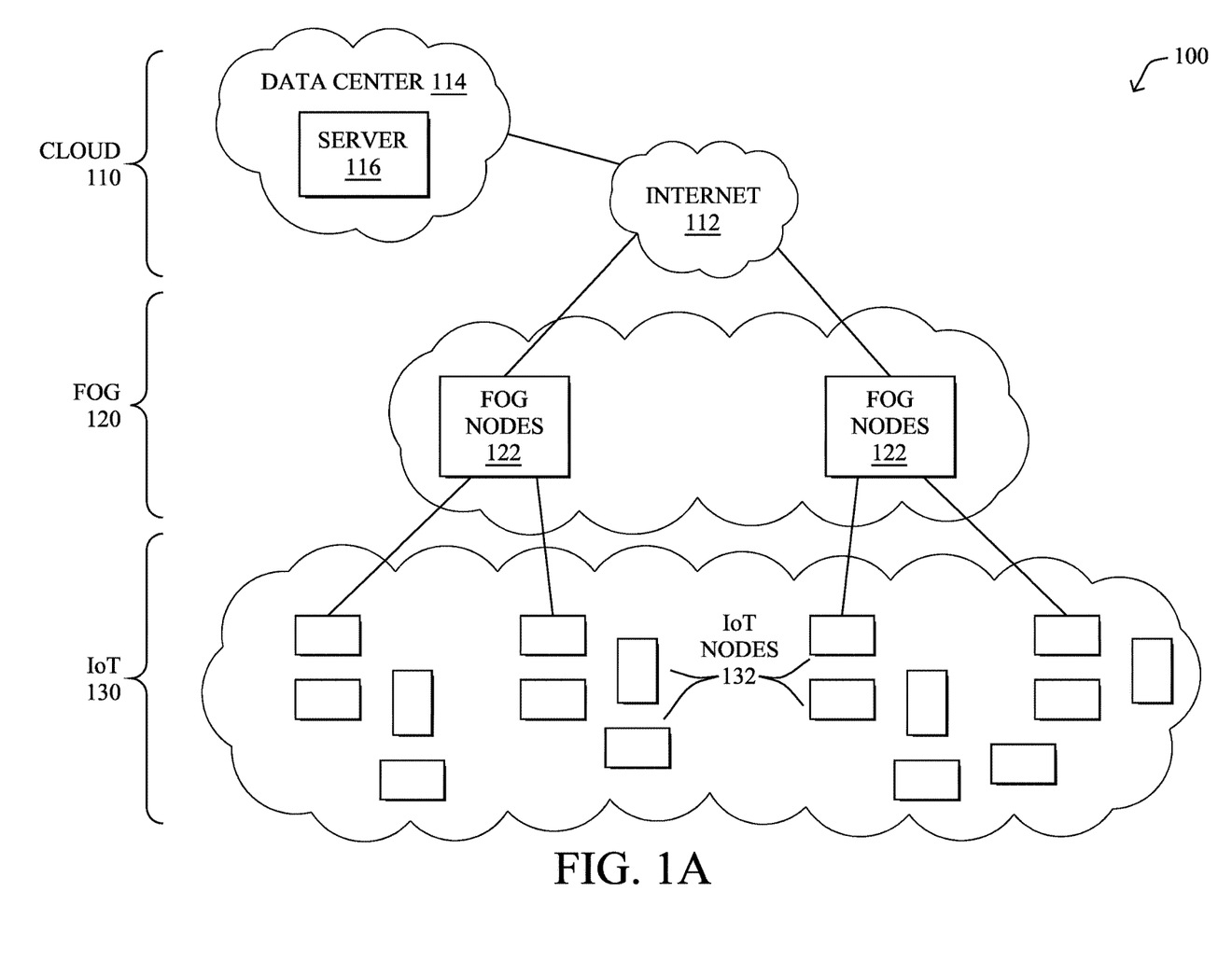
FIGS. 1A-1B illustrate an example communication network.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
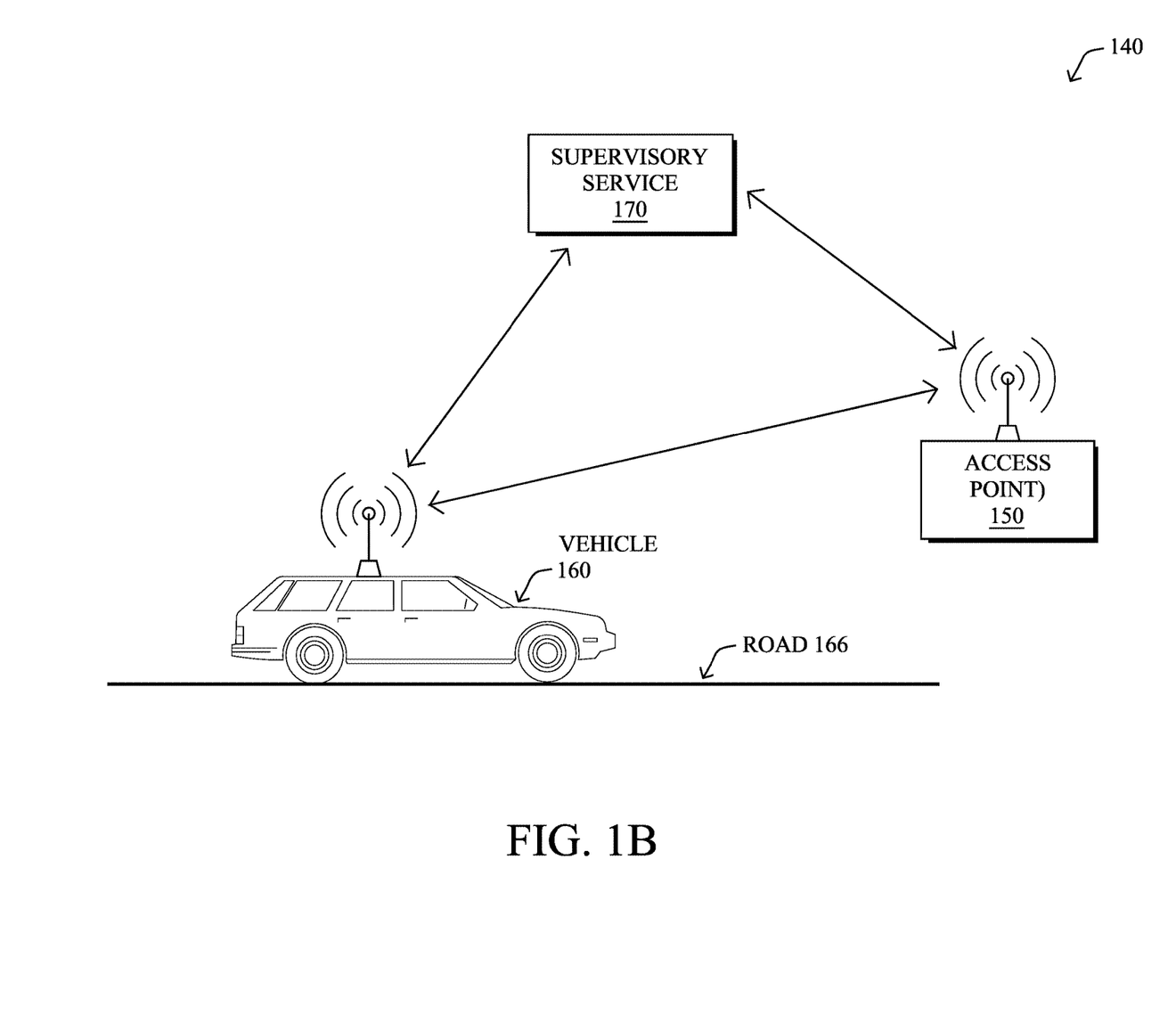

FIG. 1B illustrates an example connected vehicle system 140, according to various embodiments. In particular, connected vehicle system 140 may include any or all of the following components: a vehicle 160, an access point 150, and/or a remote supervisory service 170. During operation, connected vehicle system 140 may be operable to interface vehicle 160 with a backend computer network, such as the Internet, to which supervisory service 170 belongs.

In some embodiments, connected vehicle system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

Access point 150 may communicate with supervisory service 170 via a WAN, such as the Internet 112 or another WAN. For example, access point 150 may communicate with supervisory service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
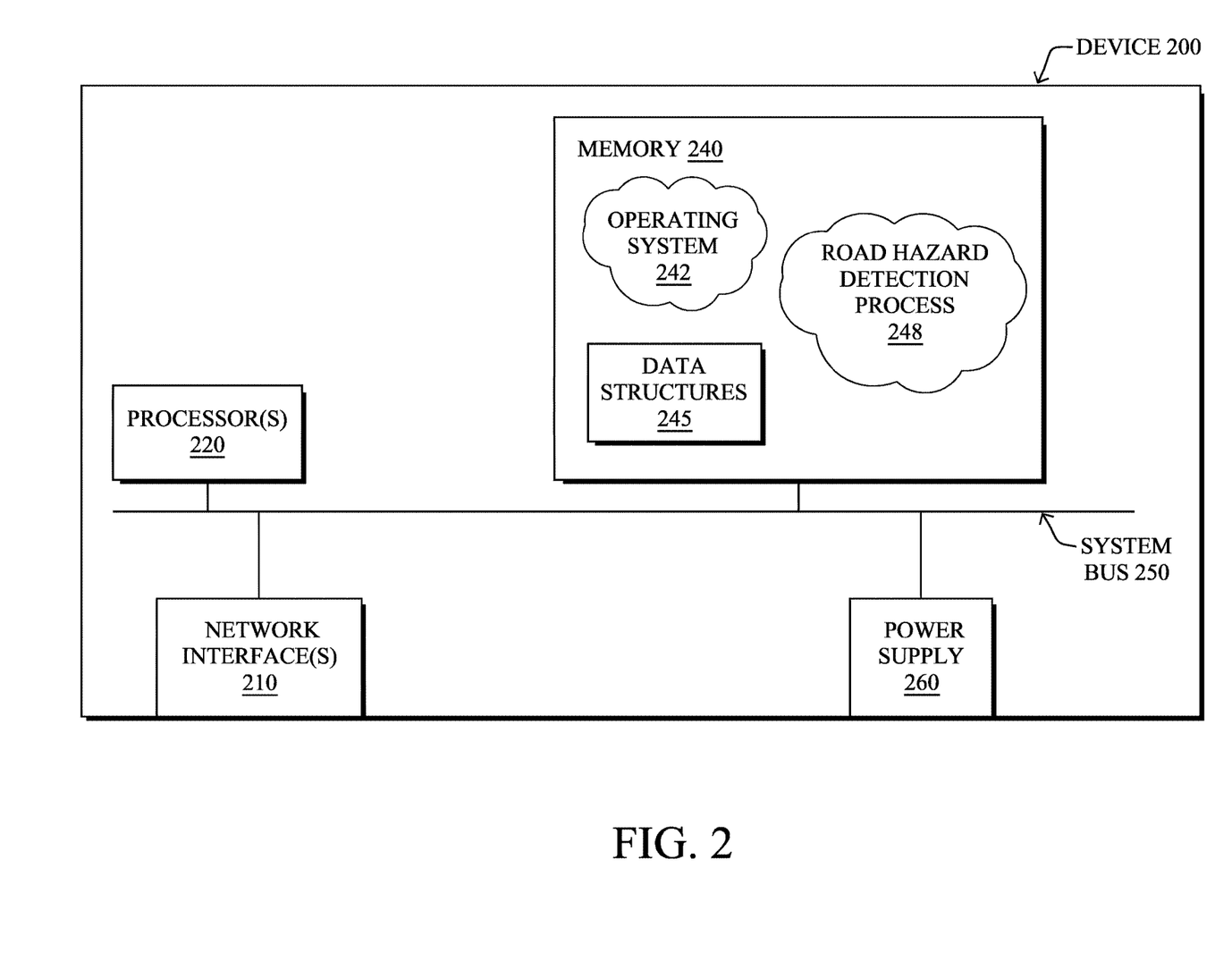
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative road hazard detection process 248, as described herein.

In general, road hazard detection process 248 may be configured to schedule the updating of the software or firmware of connected vehicles. In some embodiments, road hazard detection process 248 may do so by leveraging machine learning, to analyze sensor data captured by a vehicle and detect hazards. In general, machine learning is concerned with the design and the development of techniques that take as input empirical data and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, road hazard detection process 248 may employ one or more supervised, unsupervised, or semi-supervised machine learning models. Generally, supervised learning entails the use of a training set of data, as noted above, that is used to train the model to apply labels to the input data. For example, the training data may include video feed data and/or other vehicle sensor data (e.g., lidar, radar, etc.), that includes examples of road hazards. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that road hazard detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

As noted above, autonomous and semi-autonomous vehicles are nearing everyday adoption on the roads. A practical application of this is the formation of platoons of vehicles, i.e., a group of vehicles that travel in a coordinated manner. This is particularly of interest in the case of long haul trucking and commuter vehicles, whose movements can be coordinated so as to reduce traffic congestions. Accordingly, machine learning and computer vision are critical for fleets/platoons of vehicles to operate semi-autonomously and, eventually, fully autonomously.

For vehicle fleeting to be viable on a large scale, several challenges are envisioned:

Different vehicles in the fleet will have different machine learning/computer vision (ML/CV) capabilities. More specifically, it is envisioned that some vehicles in a given platoon/fleet may be equipped with newer, more capable object and/or hazard detection mechanisms than legacy vehicles in the fleet. In other words, one vehicle may employ a more accurate and powerful detection model than that of another vehicle in the fleet.

Different vehicles may dynamically enter and exit the fleet at different times. Because of this, the lead vehicle at any given time may not be equipped with the best ML/CV systems among the group of vehicles.

Said differently, it is envisioned that vehicles in the future will have different capabilities in terms of their hardware resources, as well as their available object/hazard detection algorithms, meaning that different vehicles will have different accuracies with respect to identifying objects and detecting hazards. Presumably, a vehicle with newer technology will have more detection capabilities than a vehicle with older technology. In addition, even if a particular vehicle is very capable from an ML/CV standpoint, the vehicle is still limited by its available pool of sensor data. If the vehicle has a limited view of the environment, for example, it may still incorrectly interpret its environment and encounter a hazard. That is, even though in many situations the models themselves will differ (different concepts/versions/programming/etc.), there are still situations where the ML models/software/version may be identical but differ in their detection proficiency. For instance, if one vehicle's ML has learned off of a different set of data (self-learning) than another vehicle, they may produce different outcomes when looking at the same image, since the tuning of the ML models over time through learning may differ.

Raw Sensor Data Sharing for Enhanced Fleet-Wide Environmental Awareness and Safety The techniques herein allow for vehicles to share their raw sensor data, for purposes of object identification, and more particularly, for hazard detection and avoidance. In some aspects, a lead vehicle of a platoon may share its sensor data with other vehicles in the platoon, to collaboratively build a more accurate interpretation of their environment. In further aspects, a vehicle may share its raw sensor data with other nearby vehicles, so as to identify an object and make a hazard assessment, if the sharing vehicle cannot or did not identify the object and therefore could not make a hazard determination from its own raw sensor data.

Specifically, according to one or more embodiments of the disclosure as described in detail below, a first vehicle makes, using a first machine learning-based model, a determination that raw image data captured by the first vehicle does not indicate the presence of a driving hazard. The first vehicle sends a hazard assessment request to a second vehicle in communication proximity of the first vehicle that includes the raw image data (e.g., and meta-data about any objects identified in the images), illustratively based on the determination that the raw image data does not indicate the presence of a driving hazard. The first vehicle receives a hazard detection response from the second vehicle that indicates a driving hazard identified by the second vehicle by applying a second machine learning-based model to the raw image data included in the hazard assessment request. The first vehicle adjusts a path of travel of the first vehicle to avoid the driving hazard identified by the second vehicle.

Illustratively, the techniques described herein may be performed by hardware, software, and/or firmware, such as in accordance with the road hazard detection process 248, which may include computer executable instructions executed by the processor 220 (or independent processor of interfaces 210) to perform functions relating to the techniques described herein.

Operationally, the techniques herein allow newer, more advanced vehicles with better analytics to make use of sensor data captured by older, less advanced vehicles. Note that those older, less advanced vehicles may be on the road for decades without upgrades to their computational hardware and, as a result, use of their sensor data is critical to the success of autonomous vehicle fleeting. Note that while the techniques herein are described primarily with respect to autonomous or semi-autonomous vehicles, the techniques herein could also apply to human-controlled vehicles, as well as vehicles on land, sea, or air.

In some embodiments, the techniques herein allow for a fleet/platoon of vehicles to make use of the full ML/CV capabilities of the fleet members, thereby allowing for greater safety of the vehicle fleeting. The steps to do so may include any or all of the following:
1. Vehicles in the fleet broadcast their raw sensor data to other vehicles in the fleet, as part of a hazard assessment request. For example, the fleet vehicles may use any suitable V2V communication approach (e.g., 5 Ghz spectrum communications, etc.), to communicate messages with other the other fleet vehicles that convey the raw sensor data captured by the vehicle for its surroundings (e.g., video feed data, lidar or radar data, etc.).
2. The nearby vehicles that receive the requests and accompanying sensor data then run their ML/CV models over this input data, to make a hazard assessment. In some embodiments, the receiving vehicle may also combine its own captured to sensor data with the received sensor data, for purposes of hazard detection. alongside the data generated by their own onboard sensors.
3. If the analyzing vehicle detects a hazard, it may generate a hazard detection response, to alert the other vehicle(s) of the fleet. For example, the detecting vehicle may broadcast an alert to the other fleet vehicles, or to the lead vehicle of the fleet, to cause the fleet to divert its path of travel around the hazard.

In some embodiments, highly intensive processing could be performed by specifically elected members of the fleet, such as those that are in the center of the fleet and may not have a good sensor view of the environment, anyways. In further embodiments, the fleet may blacklist poor performing vehicles from raising hazard detection alerts. For example, as the fleet passes the supposed hazard, if the other vehicles do not confirm that a hazard was indeed present, the vehicles may begin ignoring the vehicle that falsely detected the hazard, or alternatively, feedback could be provided to the CV/ML system of that reporting vehicle which would allow for the ML to learn from its mistakes.

Figure 3A:
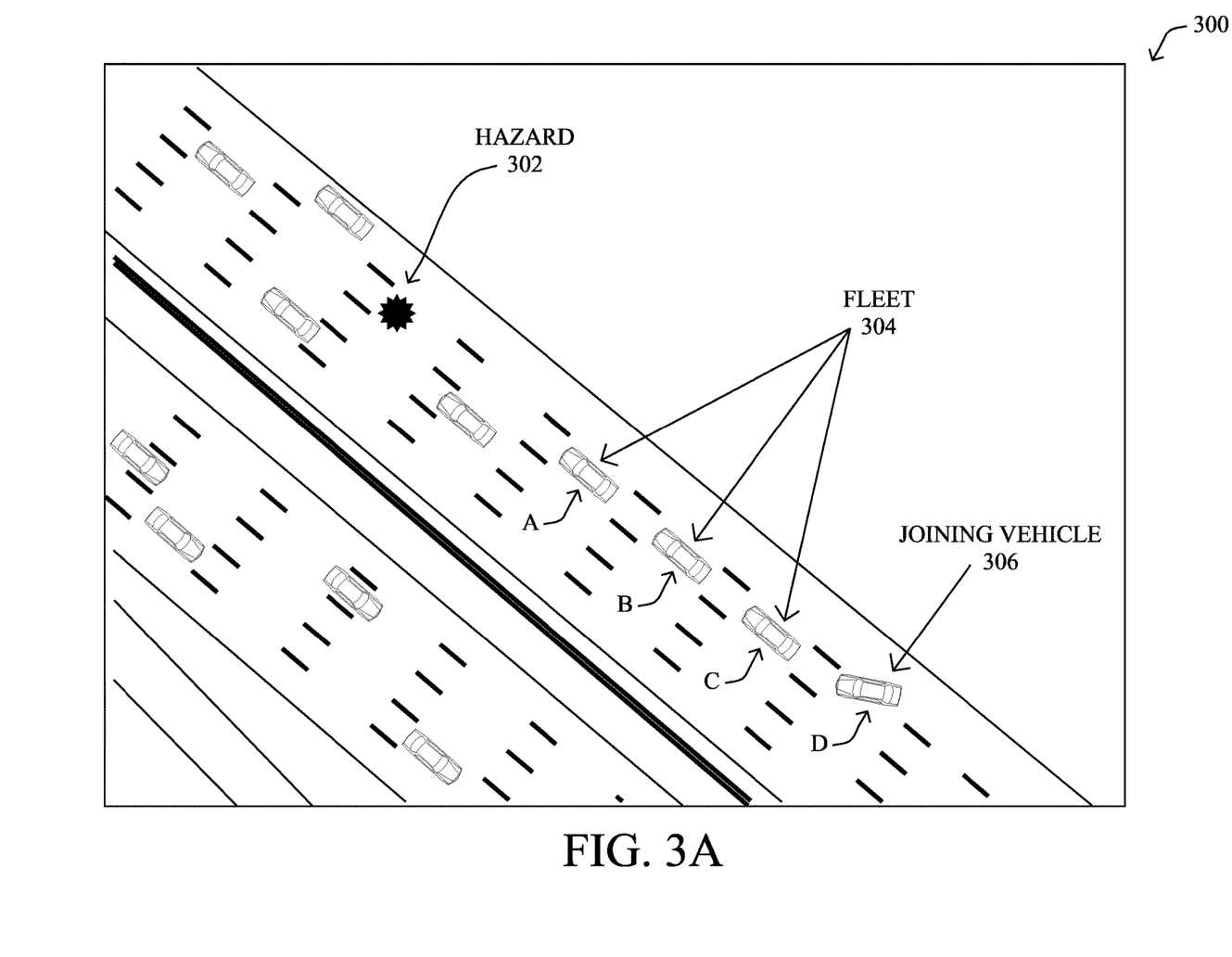
FIGS. 3A-3C illustrate an example of a hazard detection in a vehicle platoon.
Figure 3B:
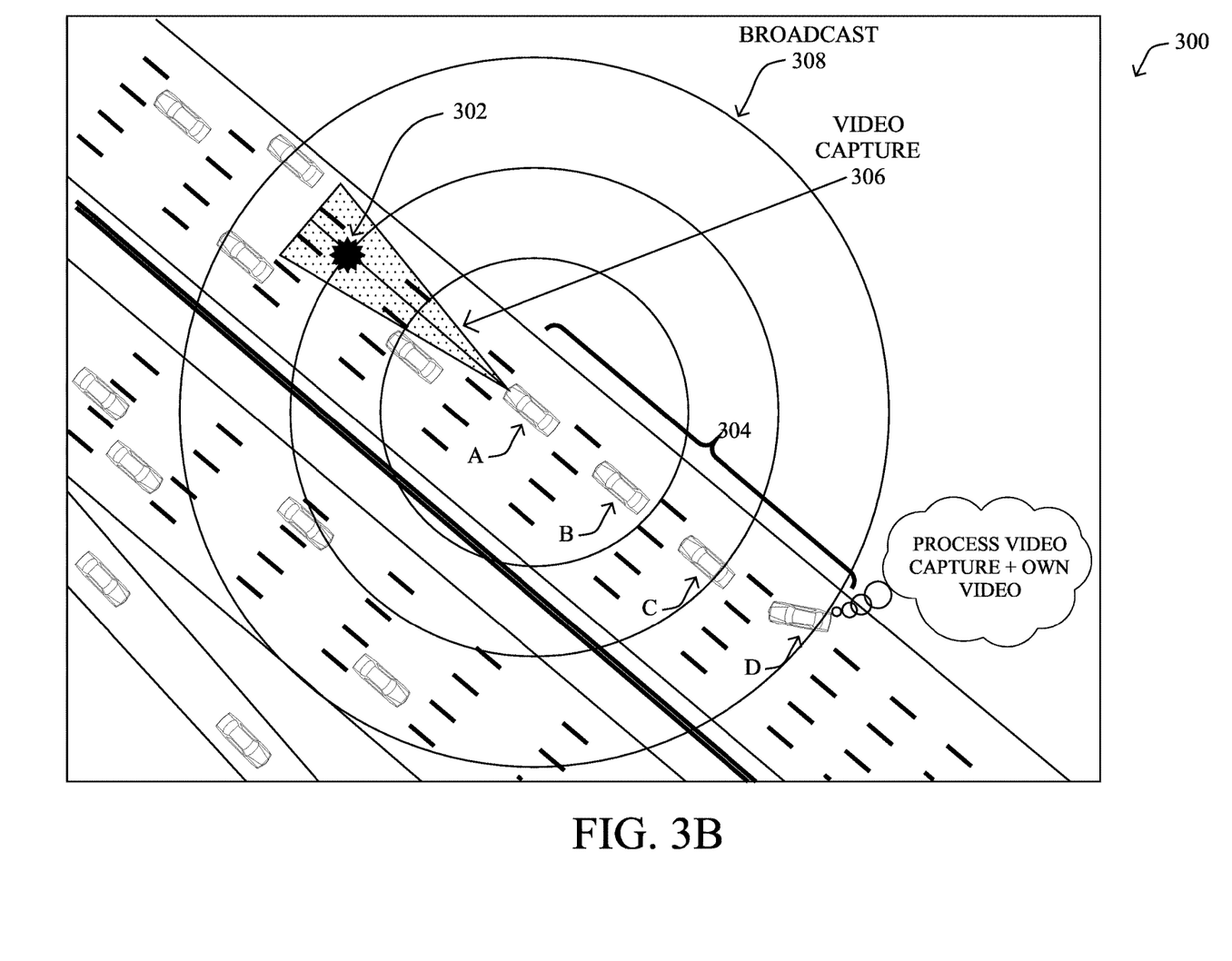
Figure 3C:
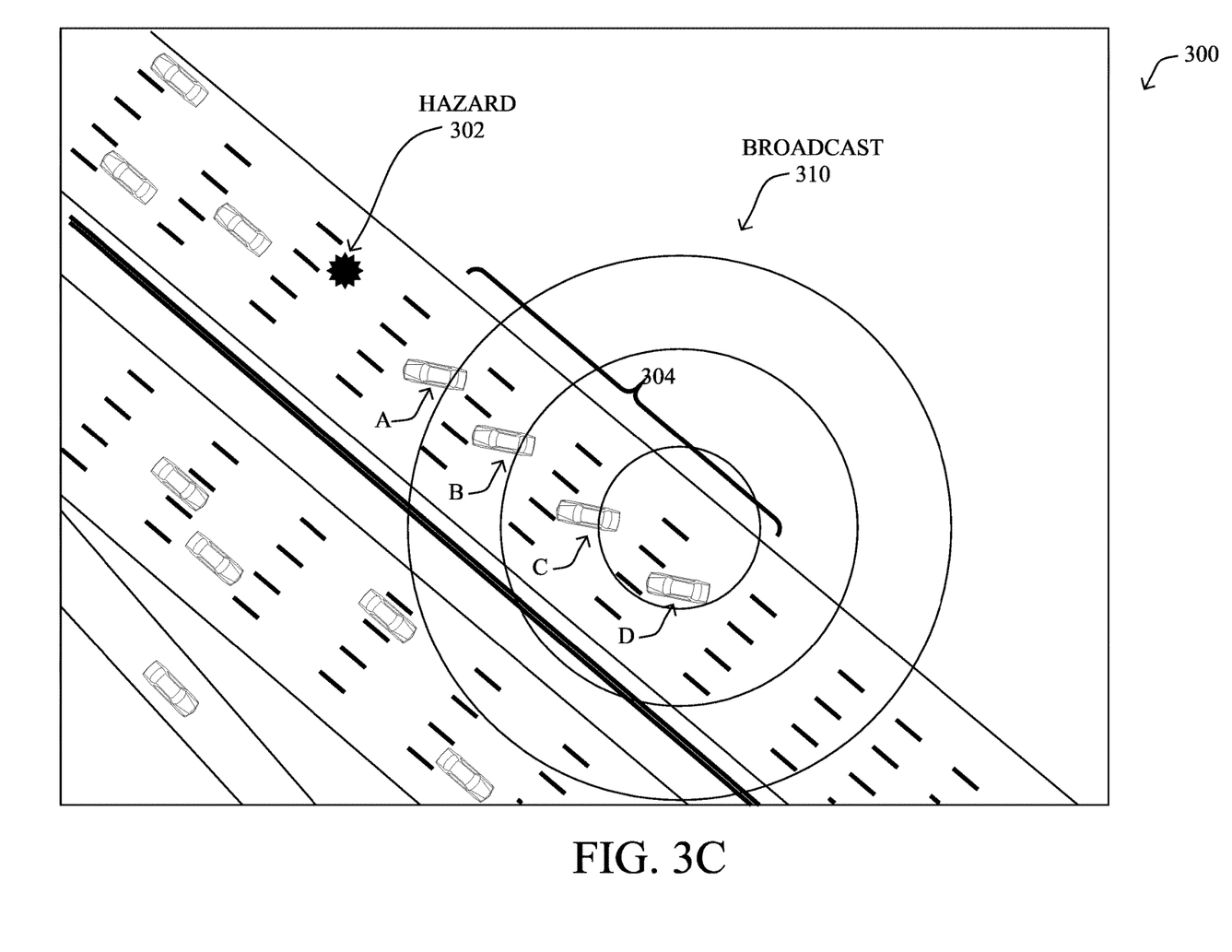

FIGS. 3A-3C illustrate an example of a hazard detection in a vehicle platoon, in accordance with the teachings herein. As shown in FIG. 3A, assume that a number of vehicles A-D are traveling along a roadway 300 and that vehicles A-C belong to vehicle fleet 304. Over the course of time, vehicle D may also join fleet 304.

For purposes of illustration, assume the following:
  A driving hazard 302 is located along roadway 300 within the path of travel of fleet 304.
  Joining vehicle D, which may be more advanced than vehicles A-C, has more capabilities in terms of its hazard detection systems.

In FIG. 3B, assume that lead vehicle of fleet 304 captures a depiction of hazard 302 as part of its video feed/capture 306. Note that the other vehicles in fleet 304 may or may not capture similar depictions of hazard 302. For example, vehicle D, the rearmost vehicle of fleet 304 may not be able to see hazard 302 from its own vantage point.

In some embodiments, as shown, lead vehicle may send out a broadcast 308 that includes its raw video data from video capture 306. In general, such a broadcast 308 may be viewed as a hazard assessment request, thereby asking any or all of the other vehicles in fleet 304 to assess the video data for hazards. Note that, in one embodiment, vehicle A may only request further assessment from vehicles B-D, if vehicle A first determines that the captured video does not indicate a hazard. To avoid broadcast 308 interfering with other vehicles on roadway 300, broadcast 300 may also include a unique identifier for fleet 304 and/or may employ an encryption mechanism, in various cases.

Note that in one embodiment, such as where the lead vehicle doesn't have the strongest or fastest detection capabilities of the fleet (e.g., another vehicle is primarily responsible for identifying objects/hazards based on the raw data, or else where other vehicles are independently responsible for their own object identification), the lead vehicle may stream its sensor data to the rest of the fleet allow for other vehicles in the fleet to identify objects and/or detect hazards, even where the lead vehicle may have completely missed it. Note that this embodiment is not mutually exclusive from lead vehicle identification of hazards, such as where the lead vehicle has high confidence that some object is not a hazard, but then a newer ML/CV system in another fleet vehicle does flag that object as a hazard. As such, in one embodiment, object/hazard identification from vehicles in the fleet behind the lead vehicle (e.g., based on superior hardware and/or software) can be sent back up to the lead vehicle.

In FIG. 3C, assume now that vehicle D receives the raw sensor data from video capture 306 and apply its own hazard detection model to the received sensor data. Vehicle D may do so either in combination with its own captured sensor data or, alternatively, in addition thereto. In turn, now assume that vehicle D is able to detect hazard 306 based on the raw sensor data in broadcast 308, while vehicles A-C were not, due to the additional detection capabilities of vehicle D.

Once vehicle D detects hazard 302, vehicle D may send a hazard detection alert, to alert vehicle A and/or the other vehicles of fleet 304 of hazard 302. For example, vehicle D may send out a hazard detection response as a broadcast 310 that indicates the detection of hazard 302 on roadway 300. In turn, lead vehicle A or another one of the vehicles of fleet 304 may adjust the course of travel of fleet 306, so as to avoid hitting hazard 302. For example, fleet 304 may move to an adjacent lane, if possible, to avoid hazard 302.

Figure 4A:
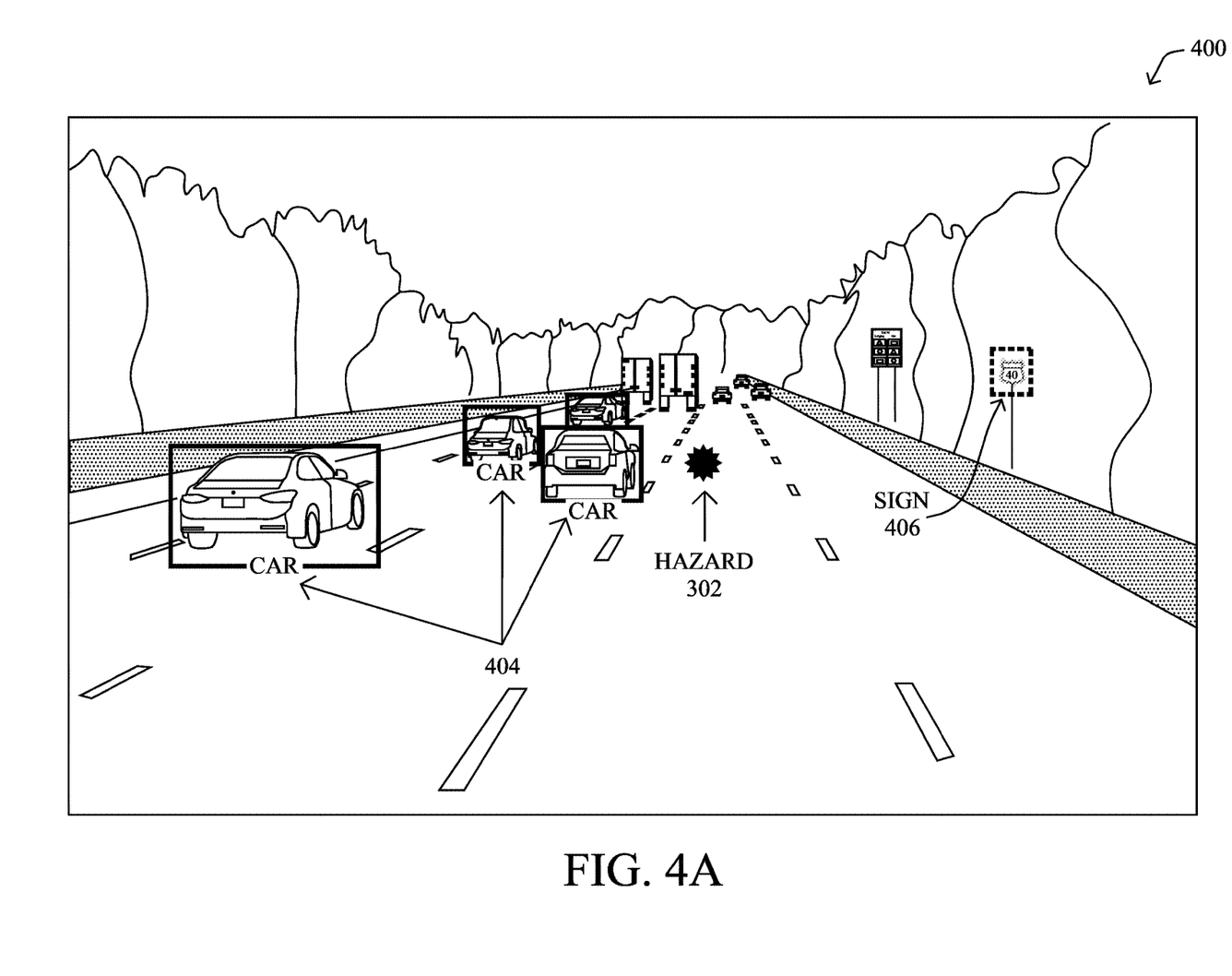
FIGS. 4A-4B illustrate examples of different hazard detector capabilities.
Figure 4B:
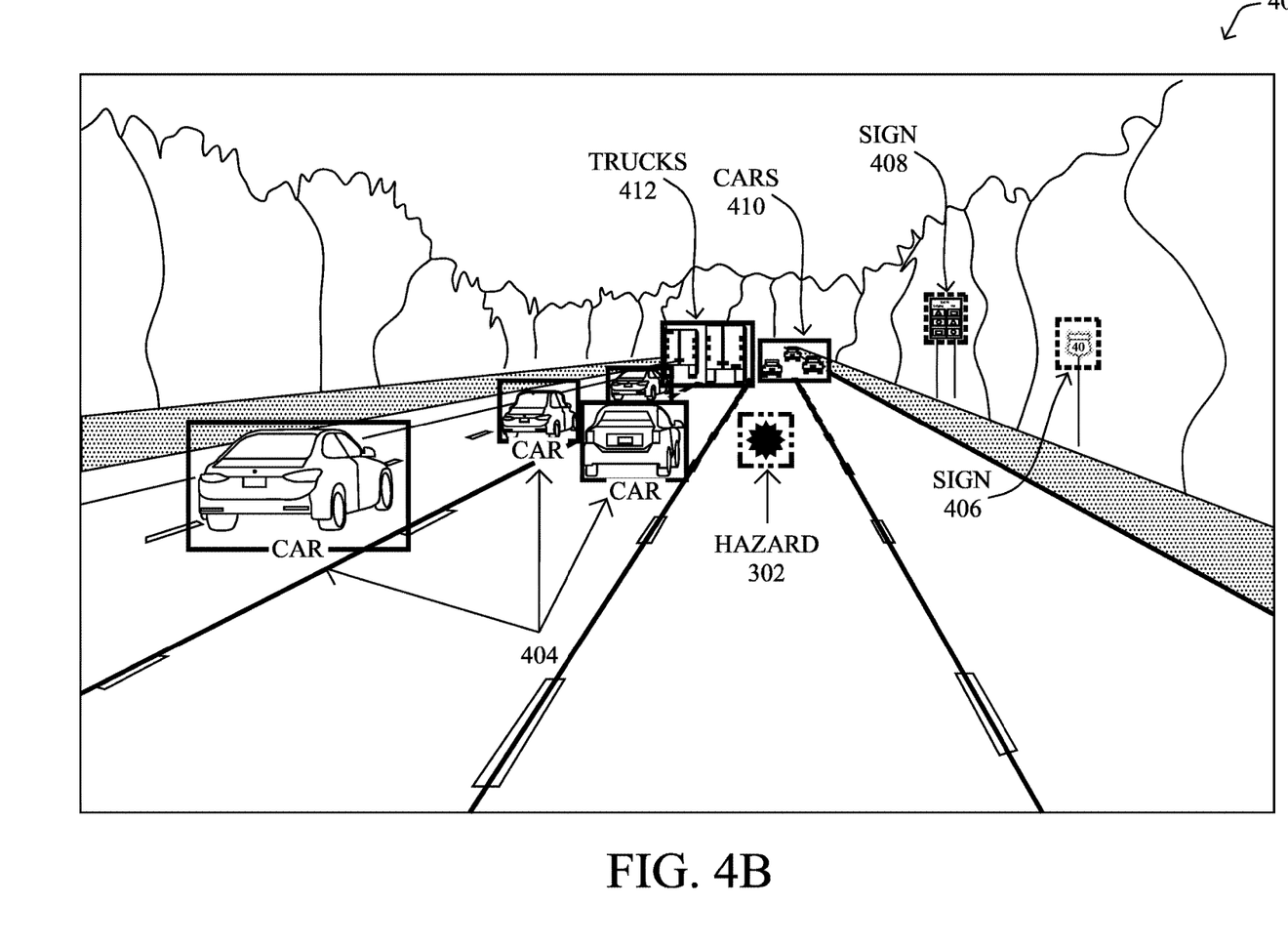

FIGS. 4A-4B illustrate examples of different hazard detector capabilities, in various embodiments. Continuing the example of FIGS. 3A-3D, assume that vehicle A of fleet 304 captures image 400 as part of its video feed and applies its own machine learning-based hazard detection model to image 400. As shown, vehicle A may detect various features of the roadway, such as other cars 404 outside of fleet 304, a roadway sign 406, and like. However, notably, vehicle A is unable to correctly identify hazard 302 from the raw video data. Using the techniques herein, vehicle A may send this captured data to other vehicles in fleet 306 for further assessment.

In FIG. 4B, again consider image 400 of the roadway, but assessed by a more capable hazard detection model, such as that of vehicle D, the tail vehicle of fleet 306. As shown, vehicle D may also correctly identify other cars 404 and sign 406, as well as other roadway features, such as other cars 410 and trucks 412. In addition, and most importantly, vehicle D may detect hazard 402 within the path of travel of fleet 406. In turn, vehicle D may notify the lead vehicle A and/or other vehicles in fleet 304, to cause the fleet to alter its course to avoid hazard 302.

In further embodiments, vehicles that are not part of the same fleet of vehicles can also leverage the sensor data sharing techniques herein, to better identify and avoid driving hazards in the roadway. In particular, if a vehicle does not detect a hazard from its captured sensor data, it may still send the sensor data for analysis by another vehicle. For example, if the first vehicle detects an object from its sensor data, but is unable to identify the object, it may send a hazard assessment request to another nearby vehicle.

If the hazard detection model of a vehicle cannot classify an object of interest, the vehicle can request classification help from another vehicle as follows:
1. A first vehicle passes by an object of interest on the road is unable to classify it. For example, assume that the first vehicle detects an object in the road, such as a puddle, but is not able to determine whether the object is benign or a significant threat, such as a large pothole.
2. The first vehicle sends a hazard assessment request to one or more other nearby vehicles, to help better identify the object of interest. The hazard assessment request, similar to those used in the fleet case detailed above, may include any or all of the following: the GPS location of the object of interest, the speed that the object of interest was moving, if applicable, and/or raw sensor data captured by the first vehicle about the object, such as LIDAR picture, video, still image(s), SONAR, etc.
3. The second vehicle receives the hazard assessment request for information and re-processes the raw sensor data from the first vehicle, potentially in combination with its own sensor data, as well. If the second vehicle determines that the sensor data is indicative of a hazard, such as a pothole, it may take any number of corrective measures. For example, if the second vehicle is heading towards the hazard, it may alter its course, accordingly (e.g., by swerving to avoid the pothole, changing lanes, etc.).
4. The second vehicle may also use V2V communications to notify other vehicles about the obstruction. For example, even if the second vehicle is not part of a fleet/platoon, it may notify any following vehicles of the newly identified hazard.

Note that, in some cases, there may not be any nearby vehicles to perform the additional hazard assessment using the raw sensor data captured by the first vehicle. In some embodiments, the first vehicle may still transmit the captured sensor data to a remote storage location, such as a cloud-based supervisory service. In turn, the service may send the captured sensor data to any vehicles in the area at a later time. For example, on a lonely road without much traffic, a vehicle could upload its sensor data to the cloud and another vehicle could make use of the sensor data two hours later, when it nears the unknown object. The data stored in the cloud about the unknown object could be appended to as each vehicle passes it, so that after some time the available sensor data about the object is substantial and most useful to lots of different things that pass by it.

Figure 5A:
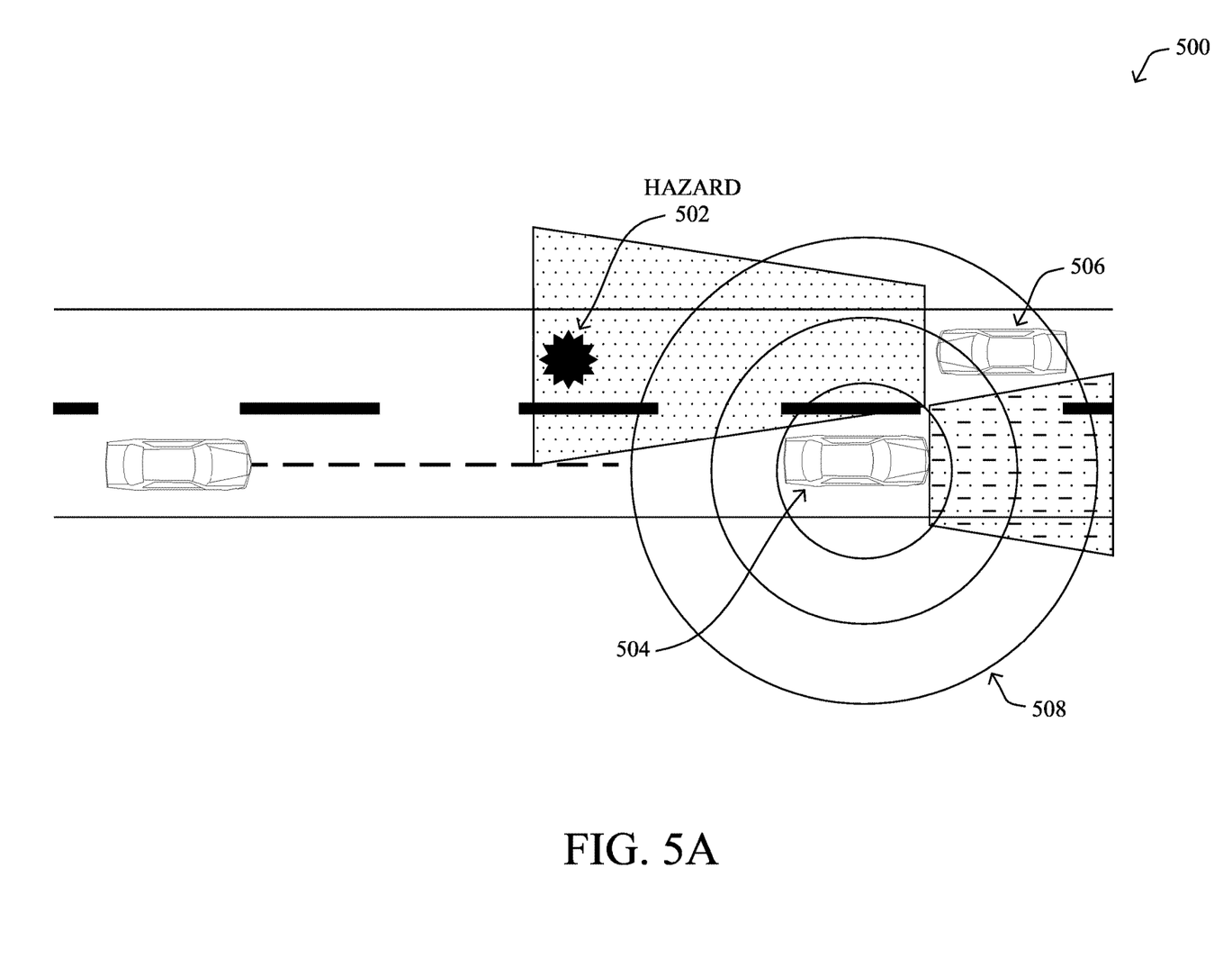
FIGS. 5A-5B illustrate an example of sharing sensor data between vehicles.
Figure 5B:
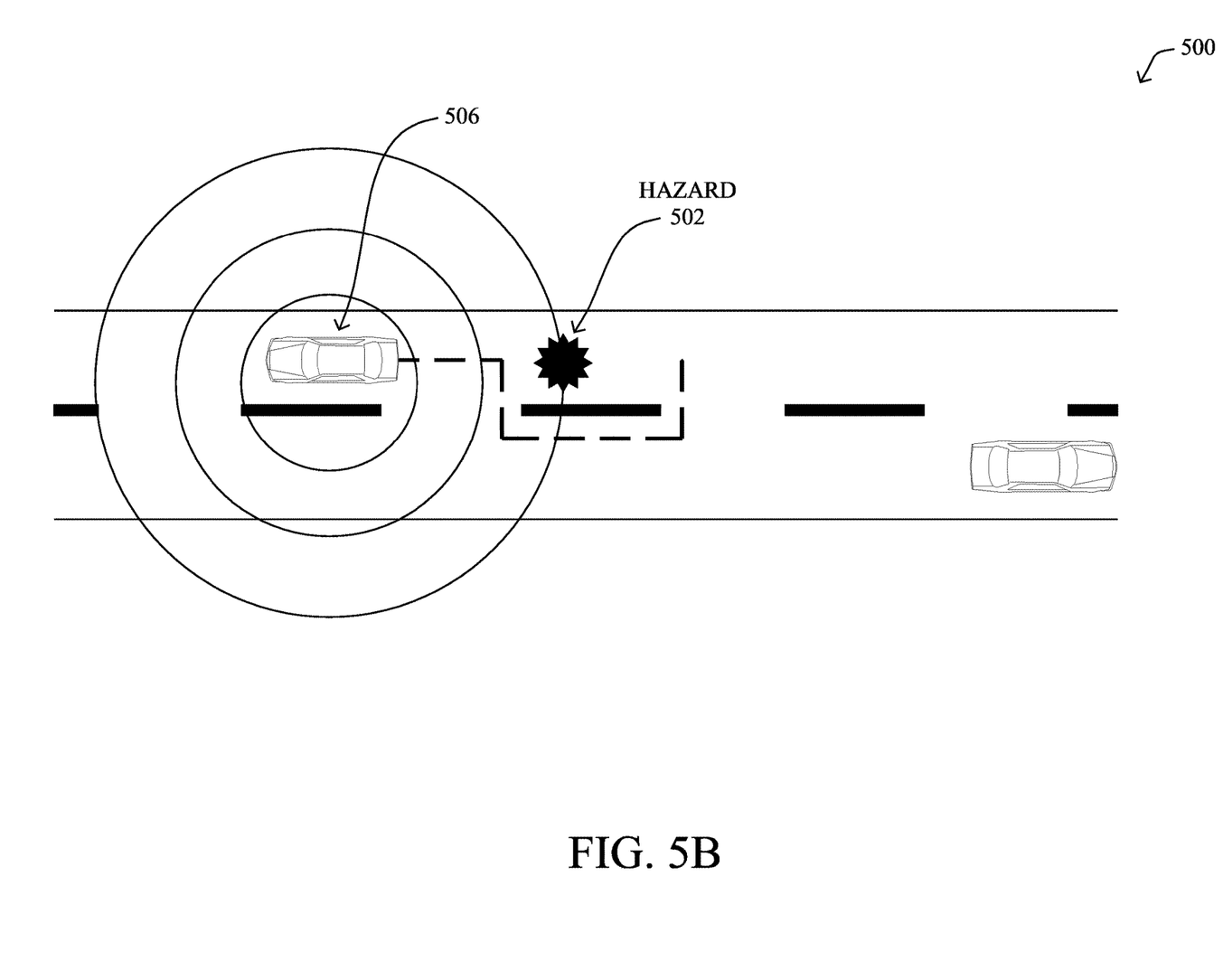

FIGS. 5A-5B illustrate an example of sharing sensor data between vehicles that are not part of the same fleet of vehicles, according to further embodiments. As shown in FIG. 5A, assume that roadway 500 includes a hazard 502. Traveling on roadway 500 are two vehicles of interest: a first vehicle 504 and a second vehicle 506.

While traveling, assume that vehicle 504 has passed hazard 502, captured raw sensor data regarding hazard 502, but is unable to classify hazard 502 as either benign or a hazard. For example, if the confidence value of the machine learning model of 504 assessing this sensor data is below a given threshold, vehicle 504 may conclude that hazard 502 is an unknown object.

Similar to vehicle 504, vehicle 506 may also capture its own raw sensor data regarding hazard 502 and identify it as an object in roadway 500. However, unlike vehicle 502, assume that vehicle 506 incorrectly identifies hazard 502 as a benign object. Thus, on its own, vehicle 506 may believe hazard 502 to be of little concern and continue on its current path, thereby encountering hazard 502.

According to various embodiments, vehicle 504 may, upon determining that it cannot determine whether hazard 502 is actually hazardous, broadcast a hazard assessment request 508 that includes its captured sensor data regarding hazard 502. In turn, vehicle 506 may combine this sensor data with its own captured sensor data, to re-classify hazard 502 using its own machine learning model. Based on the additional sensor data from vehicle 504, vehicle 506 may now determine that hazard 502 is indeed hazardous.

As shown in FIG. 5B, once vehicle 506 has determined that hazard 502 is indeed a hazard on roadway 500, vehicle 506 may adjust its path of travel, so as to avoid hazard 502. This may entail, for example, vehicle 506 switching to a different lane or adjusting its position within its current lane (e.g., to avoid hitting a pothole with one of its tires, etc.). Of course, other alterations to the travel of a vehicle in order to avoid a driving hazard also include slowing down the vehicle or even stopping the vehicle, depending on the surroundings of the vehicle.

Said differently, the techniques herein allow to vehicles that are not part of the same fleet to share data from different perspectives about something in the environment. This allows the machine learning models of the vehicles to more accurately interpret their environment by leveraging each others' raw sensor data, which can provide a different visual angle of the object.

Figure 6:
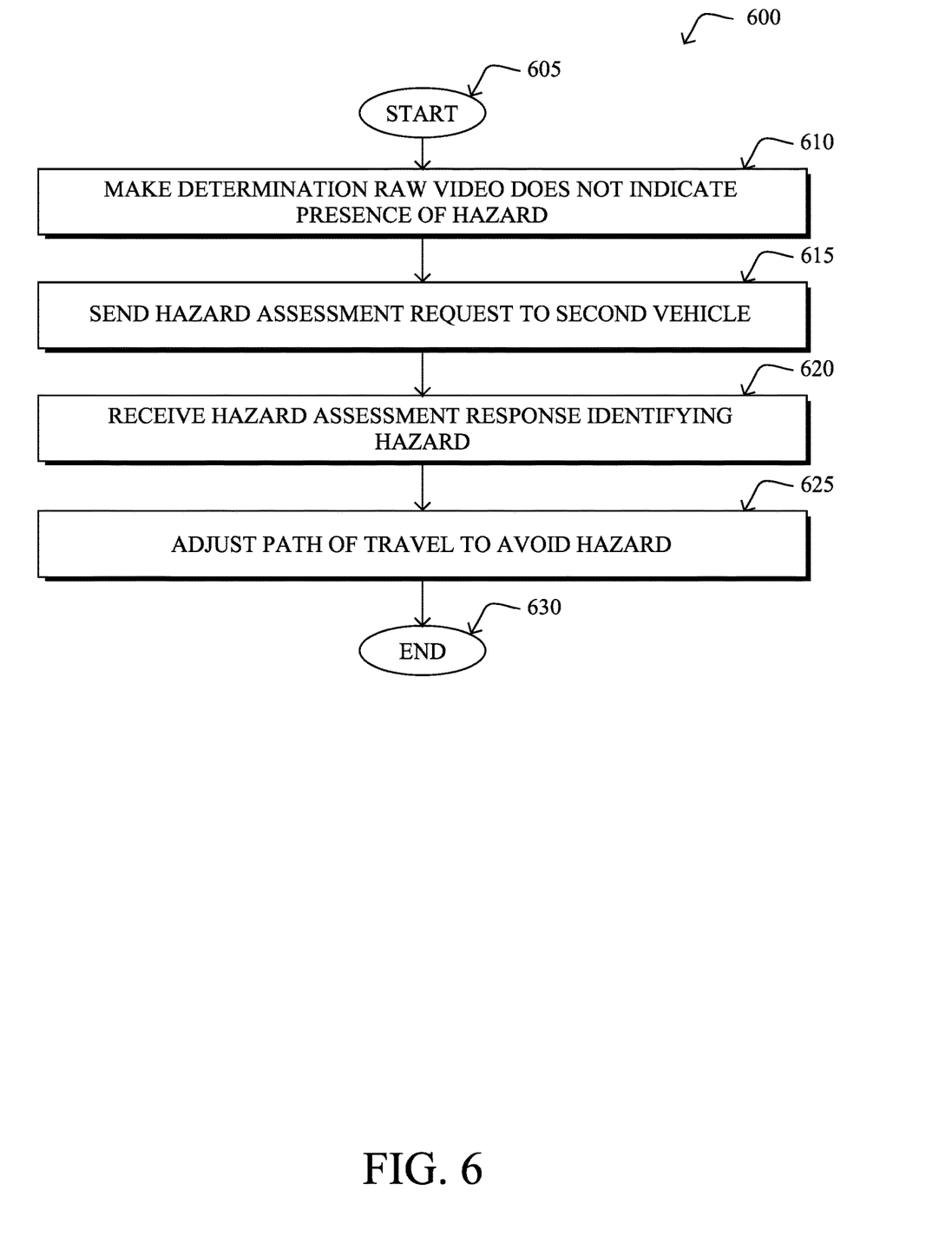
FIG. 6 illustrates an example simplified procedure for identifying objects and detecting a hazard.

FIG. 6 illustrates an example simplified procedure for identifying objects and detecting a hazard, in accordance with one or more embodiments described herein. For example, a non-generic, specifically configured device (e.g., device 200) may perform procedure 600 by executing stored instructions (e.g., process 248), such as an onboard computing device of a first vehicle. The procedure 600 may start at step 605, and continues to step 610, where, as described in greater detail above, the first vehicle may make a determination, using a first machine learning-based model, that raw image data (e.g., video, still images, etc.) captured by the first vehicle does not indicate the presence of a driving hazard. In some embodiments, this may entail the first vehicle identifying an object in its captured image data and determining that the first machine learning-based model cannot classify the object. For example, if the confidence threshold for the classification is below a defined threshold, this may indicate that the label applied to the object cannot be fully relied upon.

At step 615, as detailed above, the first vehicle may send a hazard assessment request to a second vehicle in communication proximity of the first vehicle that includes the raw image data. In particular, in one embodiment, based on the determination that the raw image data does not indicate the presence of a driving hazard, the first vehicle may send the request to one or more other nearby vehicles. In one embodiment, both vehicles may be part of the same platoon/fleet of vehicles. In other embodiments, the vehicles may be unrelated, but present in the same general location. The first vehicle may send the request, for example, as a broadcast that includes its raw sensor data (e.g., captured video/images, lidar data, sonar data, etc.). In further cases, such as when the roadway does not include a nearby vehicle, the first vehicle may upload its raw sensor data for later processing by other vehicles in the area. Note also that the first vehicle may send the raw sensor data for evaluation by another vehicle as a sanity check (e.g., if the first vehicle determines there is no hazard, but wishes to double check), for collaborative reasons (e.g., if the first vehicle cannot positively identify a roadway feature), or to rely on the assessment of the other vehicle (e.g., if the second vehicle has more detection capabilities).

At step 620, the first vehicle may receive a hazard detection response from the second vehicle, as described in greater detail above. In some cases, the response may indicate a driving hazard that the second vehicle identified by the second vehicle by applying a second machine learning-based model to the raw image data included in the hazard assessment request. Such an assessment may be done in combination with the raw sensor data captured by the second vehicle and/or in addition to thereto. For example, if the second vehicle is part of the same platoon/fleet as that of the first vehicle, and has greater hazard detection capabilities than that of the first vehicle, the second vehicle may be better suited to assess the sensor data from the first vehicle.

At step 625, as detailed above, the first vehicle may adjust a path of travel of the first vehicle to avoid the driving hazard identified by the second vehicle. For example, if the hazard is a pothole, roadway obstruction, or the like, the first vehicle may switch to a different lane or may change its location within its own lane (e.g., to the right or left), to avoid hitting the hazard. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage V2V communications to allow vehicles to share raw sensor data for purposes of detecting possible threats and hazards. In some aspects, the techniques herein can be used within a fleet of vehicles to allow a lead vehicle to leverage the potentially greater detection capabilities of any following vehicles in the fleet. In further aspects, unrelated vehicles that are not part of the same fleet can still leverage the techniques herein to better identify roadway features that cannot be positively classified as hazards.

While there have been shown and described illustrative embodiments that provide for the sharing of raw sensor data between vehicles, it is to be understood that various other adaptations and modifications may be made within the spirit and scope of the embodiments herein. For example, while certain embodiments are described herein with respect to using certain models for purposes of hazard detection, the models are not limited as such and may be used for other functions, in other embodiments. In addition, while the techniques herein are described primarily with respect to roadway vehicles, it is to be appreciated that the techniques herein are not limited as such and can be also be applied to air vehicles (e.g., drones, planes, helicopters, etc.) and/or waterway vehicles (e.g., submarines, boats, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a first vehicle, that an object is detected based on raw image data captured by the first vehicle and a first machine learning-based model applied by the first vehicle to the raw image data is unable to classify the detected object;
    in response to the determination that the object is detected and the first machine learning-based model is unable to classify the detected object, sending, by the first vehicle, a hazard assessment request to a second vehicle in communication proximity of the first vehicle that includes the raw image data;
    receiving, at the first vehicle, a hazard detection response from the second vehicle that indicates a second machine learning-based model applied by the second vehicle to the raw image data classifies the detected object as a driving hazard; and adjusting, by the first vehicle, a path of travel of the first vehicle to avoid the driving hazard classified by the second machine learning-based model.

2. The method as in claim 1, wherein the first vehicle is a lead vehicle of a platoon to which the second vehicle belongs.

3. The method as in claim 1, wherein the first and second machine learning-based models differ.

4. The method as in claim 1, wherein the first and second vehicles are autonomous vehicles.

5. The method as in claim 1, wherein the second vehicle applies the second machine learning-based model to the raw image data included in the hazard assessment request in conjunction with sensor data captured by the second vehicle.

6. The method as in claim 1, further comprising:
sending, by the first vehicle, the raw image data to a cloud-based service.

7. The method as in claim 1, wherein the second vehicle is traveling in a direction that is opposite that of the first vehicle.

8. The method as in claim 1, wherein the hazard assessment request further comprises at least one of: lidar or sonar data captured by the first vehicle.

9. An apparatus, comprising:
one or more network interfaces to communicate with a network;
a processor coupled to the network interfaces and configured to execute one or more processes; and
a memory configured to store a process executable by the processor, the process when executed configured to:
determine that an object is detected based on raw image data captured by a first vehicle and a first machine learning-based model applied by the first vehicle to the raw image data is unable to classify the detected object;
in response to the determination that the object is detected and the first machine learning-based model is unable to classify the detected object, send a hazard assessment request to a second vehicle in communication proximity of the first vehicle that includes the raw image data;
receive a hazard detection response from the second vehicle that indicates a second machine learning-based model applied by the second vehicle to the raw image data classifies the detected object as a driving hazard; and
adjust a path of travel of the first vehicle to avoid the driving hazard classified by the second machine learning-based model.

10. The apparatus as in claim 9, wherein the first vehicle is a lead vehicle of a platoon to which the second vehicle belongs.

11. The apparatus as in claim 9, wherein the first and second machine learning-based models differ.

12. The apparatus as in claim 9, wherein the first and second vehicles are autonomous vehicles.

13. The apparatus as in claim 9, wherein the second vehicle applies the second machine learning-based model to the raw image data included in the hazard assessment request in conjunction with sensor data captured by the second vehicle.

14. The apparatus as in claim 9, wherein the process when executed is further configured to:
send the raw image data to a cloud-based service.

15. The apparatus as in claim 9, wherein the second vehicle is traveling in a direction that is opposite that of the first vehicle.

16. The apparatus as in claim 9, wherein the hazard assessment request further comprises at least one of: lidar or sonar data captured by the first vehicle.

17. A tangible, non-transitory, computer-readable medium storing program instructions that cause a first vehicle to execute a process comprising:
determining, by a first vehicle, that an object is detected based on raw image data captured by the first vehicle and a first machine learning-based model applied by the first vehicle to the raw image data is unable to classify the detected object;
in response to the determination that the object is detected and the first machine learning-based model is unable to classify the detected object, sending, by the first vehicle, a hazard assessment request to a second vehicle in communication proximity of the first vehicle that includes the raw image data;
receiving, at the first vehicle, a hazard detection response from the second vehicle that indicates a second machine learning-based model applied by the second vehicle to the raw image data classifies the detected object as a driving hazard; and
adjusting, by the first vehicle, a path of travel of the first vehicle to avoid the driving hazard classified by the second machine learning-based model.

\* \* \* \* \*

UNITED STATES PATENT AND TRADEMARK OFFICE
CERTIFICATE OF CORRECTION

PATENT NO. : 10,755,575 B2
APPLICATION NO. : 16/118118
DATED : August 25, 2020
INVENTOR(S) : Jay Kemper Johnston et al.

It is certified that error appears in the above-identified patent and that said Letters Patent is hereby corrected as shown below:

In the Specification

Column 7, Line 60, please amend as shown:
combine its own captured sensor data with the Signed and Sealed this
Twenty-second Day of December, 2020

Andrei Iancu
*Director of the United States Patent and Trademark Office*